United States Patent [19]
Stanger et al.

[11] Patent Number: 5,931,083
[45] Date of Patent: Aug. 3, 1999

[54] APPARATUS AND SYSTEM FOR CONDITIONING FOOD PRODUCTS

[75] Inventors: Keith A. Stanger, New Port Richey; Mark H. Finck, Palm Harbor; Robert J. Wenzel, Tarpon Springs, all of Fla.

[73] Assignee: The Frymaster Corporation, Shreveport, La.

[21] Appl. No.: 08/929,716

[22] Filed: Sep. 15, 1997

Related U.S. Application Data

[60] Provisional application No. 60/055,464, Aug. 12, 1997.

[51] Int. Cl.⁶ .............................. A47J 37/00; A47J 37/06
[52] U.S. Cl. .............................. 99/388; 99/349; 99/386; 99/401; 99/417; 99/423; 99/443 C; 99/447; 99/467
[58] Field of Search ..................... 99/339, 340, 352–355, 99/357, 386, 388, 423, 422, 400, 401, 427, 417, 443 R, 443 C, 444–446, 450, 447, 467, 483; 126/20, 21 A, 369; 219/400, 354, 401, 464, 388; 426/523, 520, 510, 511; 422/174, 180

[56] References Cited

U.S. PATENT DOCUMENTS

| | | | |
|---|---|---|---|
| 4,179,985 | 12/1979 | Baker et al. | 99/339 |
| 4,281,594 | 8/1981 | Baker et al. | 99/386 |
| 4,433,621 | 2/1984 | Van Wyk et al. | 99/388 X |
| 4,516,486 | 5/1985 | Burkhart | 99/388 |
| 4,972,766 | 11/1990 | Anetsberger | 99/332 |
| 4,991,497 | 2/1991 | Barkhau et al. | 99/349 |
| 5,033,365 | 7/1991 | Rao et al. | 99/446 X |
| 5,044,264 | 9/1991 | Forney | 99/386 X |

*Primary Examiner*—Timothy F. Simone
*Attorney, Agent, or Firm*—Ohlandt, Greeley Ruggiero & Perle

[57] ABSTRACT

Apparatus for high speed grilling and/or conditioning of a food product which comprises: a heatable surface which is capable caramelizing the food product at a temperature in the range between about 425° F. to 575° F.; a chamber for enclosing the food product on the heatable surface under pressure; and a steam injector for introducing steam into the chamber during the caramelization of the food product.

14 Claims, 9 Drawing Sheets

APPARATUS AND SYSTEM FOR CONDITIONING FOOD PRODUCTS

This application claims the benefit of U.S. Provisional Application Ser. No. 60/055,464, filed Aug. 12, 1997.

This invention relates to the conditioning of food products. More particularly, the invention is directed to apparatus, system and method by which food products, e.g., buns, breads, muffins, etc., may be conditioned (i.e., caramelized and moisturized). The food product conditioning device of the present invention may be run either in a batch mode or an automatic continuous mode.

BACKGROUND OF THE INVENTION

Contact cooking, often referred to as "toasting" or "grilling", of food products such as dough products, for example breads, rolls, bagels, muffins and buns (hereafter collectively referred to as "buns"), is known in the commercial food service industry. It usually involves compressing one or both pieces of a sliced bun, cut-surface(s) down in contact with a surface heated at a high temperature for a time sufficient to heat the interior of the bun to from about 150° F. to about 170° F. This is done to dry and caramelize the cut surface(s) of the bun. Caramelization is desired because it provides a visually appealing, at least partially-bonded surface texture which crunches when bitten. The bonded surface also seals the cut surface which prevents juices from the food and moisture from condiments from entering the interior of the bun and rendering it soggy.

Typical buns are flash frozen after the initial baking thereof. Prior to commercial use, the buns are thawed for a minimum of twelve (12) hours to room ambient temperature. This product is defined as one of the driest and most difficult to grill and maintain the desired final attributes.

Conventional grilling apparatus and methods have several shortcomings. They are slow in that they require a grilling time of from about 30 to 45 seconds or more to obtain the desired bun internal temperature and to achieve the desired caramelized contact surface texture. Also, heating the buns at required temperatures of about 150° F. to 170° F. for such times drives moisture out of and dries the buns. For example, with conventional grilling systems there is about a 5 to 7% loss of moisture from standard burger buns which typically have a relatively low moisture content of about 32%. This causes drying especially of edges of the buns which causes the edges to curl or roll upwards. Further, conventional grilling apparatus are open at both ends to allow the buns to enter and exit the apparatus. This is disadvantageous because it allows energy and heat to escape from the grilling apparatus. Conventional grilling systems also are not adapted to apply uniform pressure onto the buns to achieve uniform caramelization of buns of different or irregular sizes, profiles and/or configurations.

It is a main objective of this invention to overcome the above and other limitations and disadvantages of conventional high temperature contact toasting or grilling devices. That is, the bun conditioning apparatus of the present invention provided improved productivity by reducing processing time and provides a means which contact caramelizes a bun and heats it 165° F.±5° F. in less than 20 seconds.

An object of this invention is to provide an improved high temperature toasting or grilling apparatus and method which caramelizes buns more rapidly, preferably with less drying of the buns, thereby eliminating dried and/or rolled bun edges.

Another object of this invention is to provide an improved high temperature, high speed bun grilling apparatus and method which provides grilled and/or caramelized buns which retain a higher percentage of their pre-grilled moisture content. Another object of this invention is to provide the aforementioned grilling apparatus which is adapted to reduce energy and heat loss from the grilling system.

Another object is to provide a unique grilling apparatus which is capable of producing a uniform caramelization of the cut surface(s) of buns, while avoiding damage to or disfigurement of the buns.

Another object of this invention is to provide a grilling apparatus which is capable of producing a uniform pressurization and caramelization of buns of different or irregular sizes, profiles and/or configurations.

Yet another object of this invention is to provide the aforementioned uniform pressurization and caramelization without leaving compression markings on the crown of the treated buns.

Still another object of this invention is to provide an improved high temperature, high speed grilling apparatus, including automated types, for the fast food service industry. It is also an object of the present invention to restore or recondition a previously flash frozen bun which has been thawed so as to provide an extremely dried buns. Such dried buns are extremely undesirable to taste and it would be highly desirable to restored the original soft, moist texture to a thawed bun which is perceived by the consumer to have the original consistency and taste of a fresh baked bun.

SUMMARY OF THE INVENTION

A method for caramelizing a surface of at least one food product which comprises heating a surface of the food product, in the presence of steam, for 20 seconds or less, preferably between about 8 to 12 seconds, and at a temperature and pressure sufficient to caramelize the surface of the food product. The method preferably comprises the additional step of applying pressure to the food product during the heating step.

The food product is preferably heated to a temperature in the range from between about 425° F. to 575° F., more preferably between about 450° F. to 550° F., and most preferably between about 475° F. to 525° F.

The resultant caramelized food product exhibits a moisture loss of about 3% or less during the heating step, more preferably between about ½% to 1%.

The pressure is developed by flashing water to produce the steam. The water is preferably present in an amount between about 1.5 grams to 5.5 grams per single food product.

The present invention also includes a method for conditioning of food products which comprises the following steps: heating a heat transfer surface to a temperature between about 425° F. to about 575° F.; placing at least one food product against the heated surface; enclosing the food product in chamber formed in part by the heated surface; and caramelizing the food product on the heat transfer surface under pressure and in the presence of steam for about 20 seconds or less.

The present invention also includes an apparatus for high speed grilling and/or conditioning of a food product which comprises: a heatable surface which is capable caramelizing the food product at a temperature in the range between about 425° F. to 575° F.; a chamber for enclosing the food product on the heatable surface under pressure; and means for introducing steam into the chamber during the caramelization of the food product. Preferably, the chamber comprising a food product containment chamber, a secondary steam chamber which is capable of preventing steam droplets from contacting the food product, and a means for applying physical pressure to the food product to ensure that the food product is in substantial contact with the heatable surface.

Finally, the present invention also includes a system for high speed caramelizing of a food product which comprises: means for heating a heat transfer surface to a temperature between about 425° F. to about 575° F.; means for placing at least one food product against the heated surface; means for enclosing the food product in chamber formed in part by the heated surface; and means for caramelizing the food product on the heat transfer surface under pressure and in the presence of steam for about 20 seconds or less.

DETAILED DESCRIPTION OF THE INVENTION

FIGS. 1–4 show a preferred embodiment of a contact grilling apparatus 10 which is comprised of a griller 12 having an assembly 14, which includes an upper portion and a lower portion, and which defines a chamber 15. The upper portion is comprised of an enclosure, here, a cover 16 closed and sealed against a portion of the lower portion comprised of a heated surface, preferably a platen 18 (dashed lines in FIGS. 2 and 3) and having a release material generally designated 20 thereon. The apparatus is mounted on a platform 22. Release material 20 can be any suitable material such as a coating or surface. Preferably, release material 20 is a sheet of Teflon®-coated fiberglass, preferably 3 milliliters thick, which can be purchased as TFE-Glass Fabric or as SRC-Glass Fabric, each is available from various distributors of industrial materials, such as McMaster-Carr of Atlanta, Ga. "Teflon" is the registered trademark of DuPont de Nemours and Co. A handle 24 is attached to an outer surface of cover 16. Release material 20 is removable to facilitate cleaning or for replacement.

Figure 4:
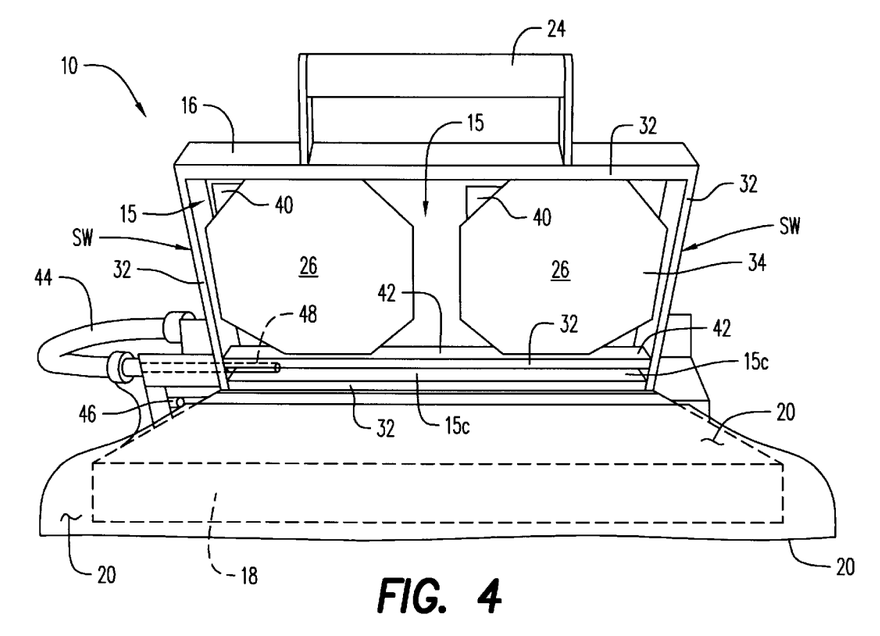
FIG. 4 is a front elevation showing the apparatus of FIG. 1 in the open position.

FIG. 4 shows griller 12 in the open condition. More particularly, FIG. 4 shows that the chamber structure, here cover 16, preferably has associated therewith at least one pressure member, e.g., a pressure plate 26, adapted to apply pressure against a food product such as a bun when it is positioned on release material 20 and cover 16 is closed upon and sealed against heated platen 18 and/or release material 20. Chamber 15 is defined, in part, by the inside of the top and side walls of cover 16, their seals, and platen 18 and/or release material 20. Release material 20 is considered a heated surface since heat provided by the underlying platen 18 is transferred to release material 20. Pressure plates 26 are associated with or mounted to chamber 15 in any suitable manner. Preferably, pressure plates 26 are adapted to and are attached to cover 16 in a manner that allows them to float or move to accommodate and apply pressure equally or uniformly to all or a portion of the upper crown or heel surfaces of buns of different or irregular sizes and/or shapes or profiles placed on release material 20, including in positions not directly under pressure plates 26.

Figure 8:
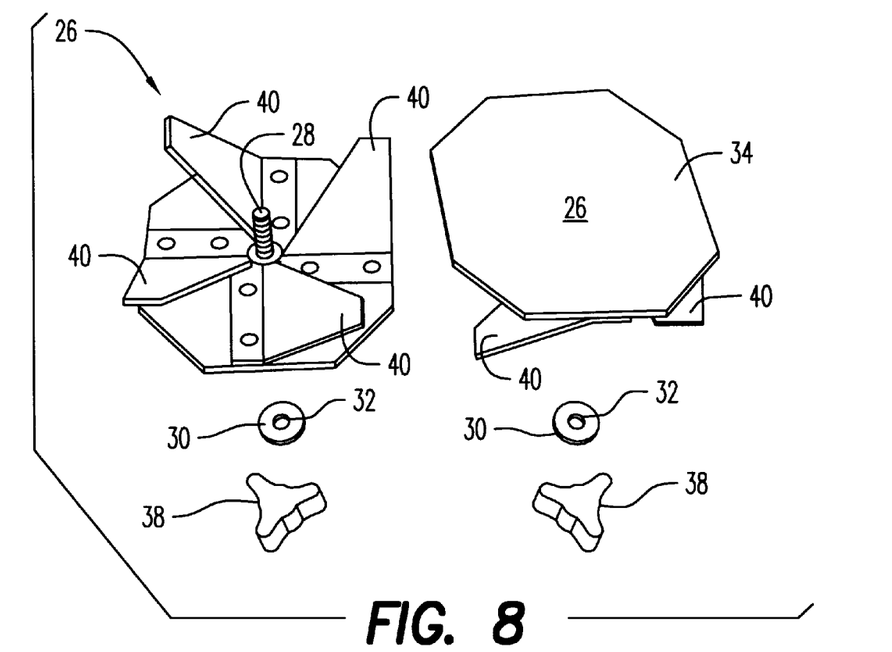
FIG. 8 is a top perspective view showing the pressure plates employed in FIG. 5.
Figure 9:
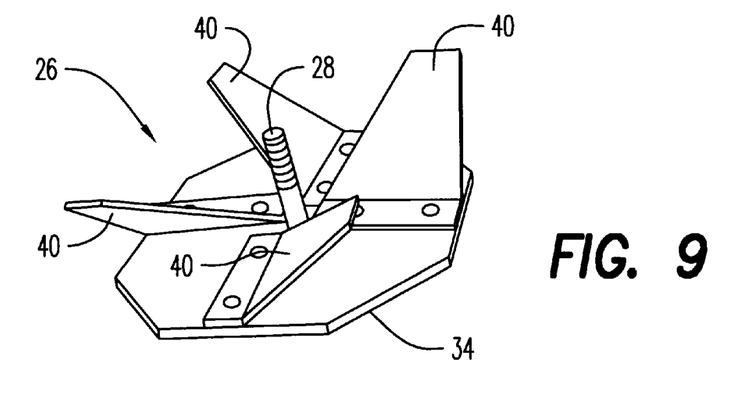
FIG. 9 is a top perspective view of one of the pressure plates.

In the preferred embodiment shown in FIGS. 4, 9 and 9, each pressure plate 26 is affixed by welding to a centrally located bolt which extends perpendicularly up through an aperture in cover 16. The bolt passes through a washer 30 having a seal 32 (which can be a silicone material) (FIGS. 8 and 9) about its opening to seal heat and moisture vapor within chamber 15. The height of bottom face 34 of each pressure plate 26, relative to release material 20, is independently adjustable by nuts 36 threaded onto bolts 29 and by wing nuts 38.

Preferably, one pressure plate 26 is adapted to contact and satisfactorily compress those crown bun halves having an outer domed surface and the other plate 26 is adjusted to satisfactorily compress those heel bun halves having an outer more planar surface. Each pressure plate 26 preferably has associated therewith, a self-adjusting structure such as one or more spring members 7 here shown as spring fingers 40 which are of equal lengths affixed, e.g., welded to the plates and calibrated to apply the desired uniform compression pressure against a portion or all of the top or crown surface of the buns to provide uniform contact, pressure and caramelization of the buns' cut surfaces against release material 20. Each spring forger preferably is tail wing-shaped and has a relatively wide base position welded to pressure plate 26 and a blade portion which narrows to a tip removed from the base. Spring fingers 40 need not touch but should be closely adjacent to, or preferably lightly in contact with, the inside surface of cover 16 such that each can independently and/or collectively bias all or a portion of the face of each plate 26 against an underlying bun. One or any combination of spring fingers 40 can contact the inside surface of cover 16, and thereby cooperatively bend or give toward plate 26 and thereby allow plate 26 to float to accommodate buns of different or irregular sizes, shapes and/or configurations, or buns not accurately positioned, oriented or centered directly under a pressure plate 26.

With the adjustable feature or structure, plates 26 can apply uniform pressure against the bun, and provide uniform caramelization of the cut surface(s) of the buns, without damaging or disfiguring the buns. The faces of pressure plates 26 can be of any suitable size, shape or configuration. Preferably, they are flat or substantially flat and provide a continuous, uninterrupted or smooth surface (without markings), to avoid impressing markings upon the bun. Pressure plates 26 and spring fingers 40 can be made of any suitable material. Preferably, the material is rigid and heat conductive. It has been found that 14-gauge stainless steel is a suitable material and functions well for grilling and uniformly pressurizing and caramelizing the buns.

The grilling apparatus of this invention is provided with a source for supplying vaporized moisture into the chamber while it is closed and sealed, such that the moisture is effective in moisturizing and preferably maintaining the moisture content of the buns during grilling. As will be explained, the moisture is vaporized almost instantaneously and also adds heat to the chamber and the buns being grilled, thereby increasing the speed of caramelization of the buns. Although any suitable source, structure and manner can be employed for providing the vaporized moisture, preferably the moisture is introduced into the inside of cover 16 in a manner that the moisture does not directly contact the buns being or to be grilled, as it has been found that moisture droplets inadvertently deposited on the bun surface form unappealing whitish, prey or faded spots on the bun surface.

Figure 1:
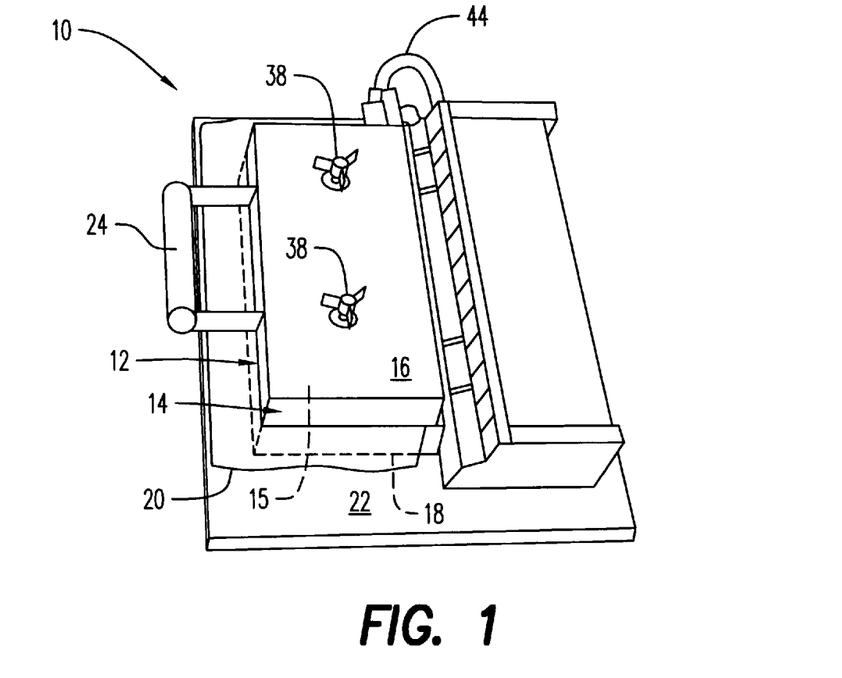
FIG. 1 is a top perspective view of a preferred embodiment of the apparatus of the invention.
Figure 2:
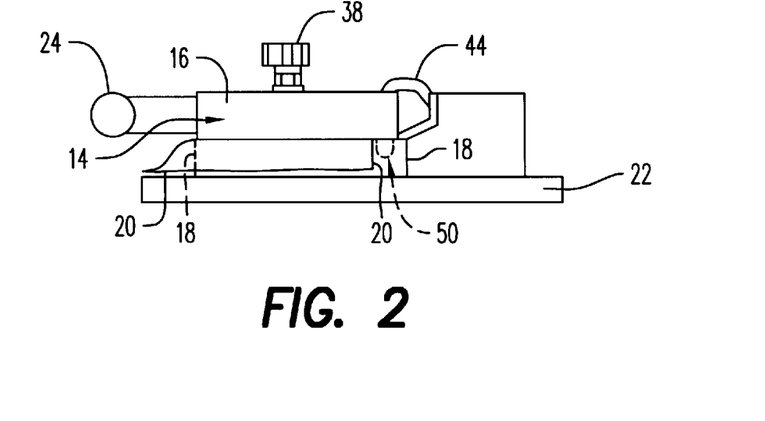
FIG. 2 is a side elevation of the apparatus of FIG. 1.
Figure 3:
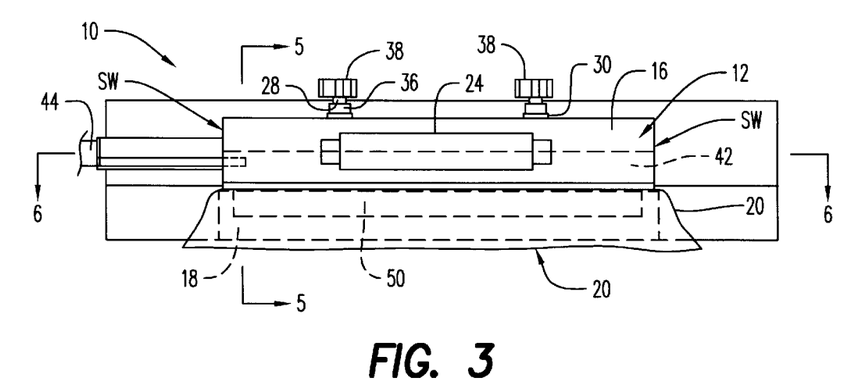
FIG. 3 is a front elevation of the apparatus of FIG. 1.
Figure 5:
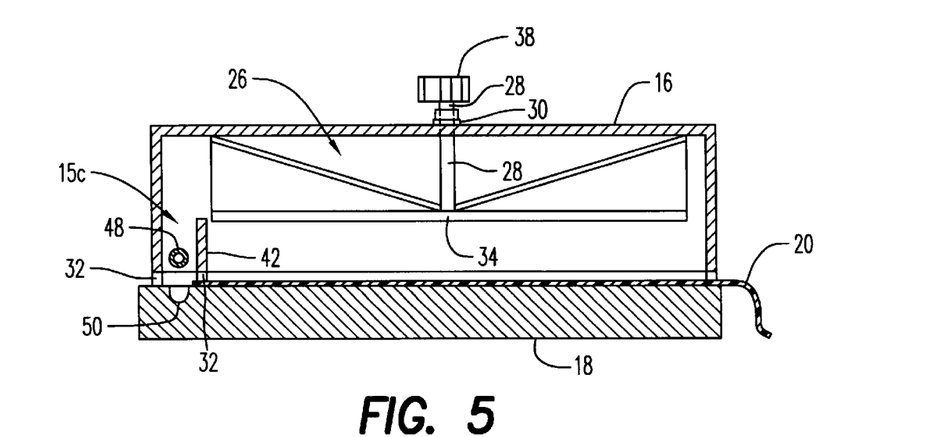
FIG. 5 is a vertical sectional view taken along line 5—5 of FIG. 3.
Figure 6:
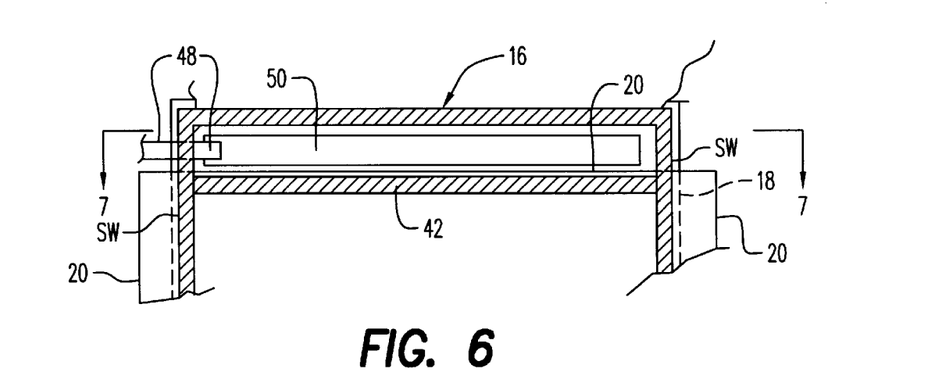
FIG. 6 is a horizontal sectional view taken along line 6—6 of FIG. 3.
Figure 7:
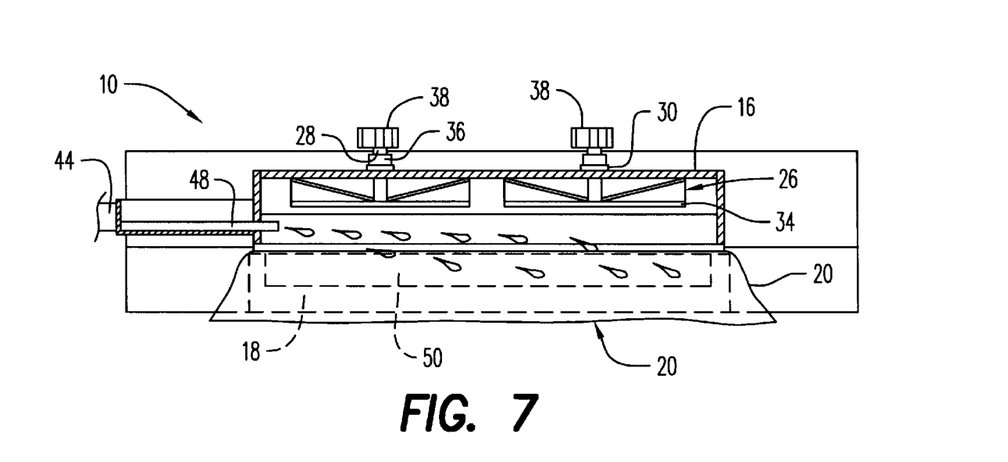
FIG. 7 is a front elevational view of the apparatus similar to FIG. 3, but with the front wall of the cover removed.

Toward that end, preferably the inside of cover 16 is provided with a sub-chamber 15c which can be formed in any suitable manner. Preferably, sub-chamber 15c is defined by a divider wall 42, which can have any suitable location, size, shape or configuration sufficient to uniformly, indirectly (i.e., without directly controlling the buns) distribute or provide moisture within sub-chamber 15c during grilling. Preferably, divider wall 42 runs from a location adjacent the source along a portion or all of the length, width or periphery of cover 16. Preferably, divider wall 42 runs parallel to and adjacent the front wall of cover 16 and extends from one cover side wall to the other. As shown in FIGS. 3, 5 and 7, the top edge of divider wall 42 does not communicate with the inside surface of the top wall of cover 16. Preferably, divider wall 42 is about ½ the height of the inside of cover 16. The lower edges of the side walls of cover 16 and divider wall 42 are in the same plane and are provided with a suitable seal member for sealing sub-chamber 15c against loss of heat, energy or moisture when cover 16 is closed down against release material 20 and/or heating surface 18 during grilling.

As shown in FIG. 4, a source of supply of a moisturizing liquid, preferably water, such as a tank or faucet (not shown) communicates with a conduit 44 which in turn communicates with a valve, for example, an automatically controlled solenoid 46 and a suitable injection nozzle 48 for injecting water as desired into sub-chamber 15c. As shown in FIGS. 4–7, the orifice of nozzle 48 is located in sub-chamber 15c adjacent the side wall of cover 16, between it and divider wall 42. The orifice preferably overlies an elongated reservoir or channel 50 formed in heated plate 18. The seals on the lower edges of the rear wall, side walls and divider wall 48 of cover 16 circumscribe sub-chamber 15c above channel 50. As shown in FIG. 7, nozzle 48 injects water in a burst, as a continuous stream, or preferably in droplets, into sub-chamber 15c. The water droplets fall onto the heated surface of channel 50. When the water droplets hit the channel surface which is heated to a temperature in the range between about 425° F. to 575° F., the droplets instantaneously vaporize into steam. Since the lower edges of divider wall 42 and of cover 16 are sealed against heated surface 18 about channel 50, the steam rises through sub-chamber 15c and passes over divider wall 42 and into chamber 15 above pressure plates 26. Heat from the steam (212° F.) is transferred in part to pressure plates 26 which in turn heat the buns in the griller. With the steam in chamber 15, the temperature of pressure plates 26 preferably is about 200° F. If the temperature of pressure plate 26 is too high, e.g., about 300° F., the top uncut surface of the bun will tend to dry and change in appearance. The steam follows the contour of the main chamber 15, flows downwardly about and past the periphery of the respective pressure plates 26 and moisturizes and heats the buns without negatively affecting their appearance.

The grilling apparatus of this invention can be operated manually or with any degree of automation. In the previously described embodiment, an operator of the grill would manually close cover or lid 16 by a handle, place the cut surface of the bun halves down onto the heated surface 18 and close cover 16 to seal chamber 15 during grilling. Upon completion of grilling, the operator would manually lift cover 16 and remove the grilled caramelized buns.

Those skilled in the art will understand from the teaching herein that various aspects of the grilling apparatus can be adapted to work automatically. For example, cover 16 can be opened and closed automatically at set time intervals sufficient for grilling the buns fed by an indexed or continuous conveyor. Thereafter, cover 16 can be automatically opened and the buns can be manually, semi- or fully automatically removed from heated surface 18.

Figure 10:
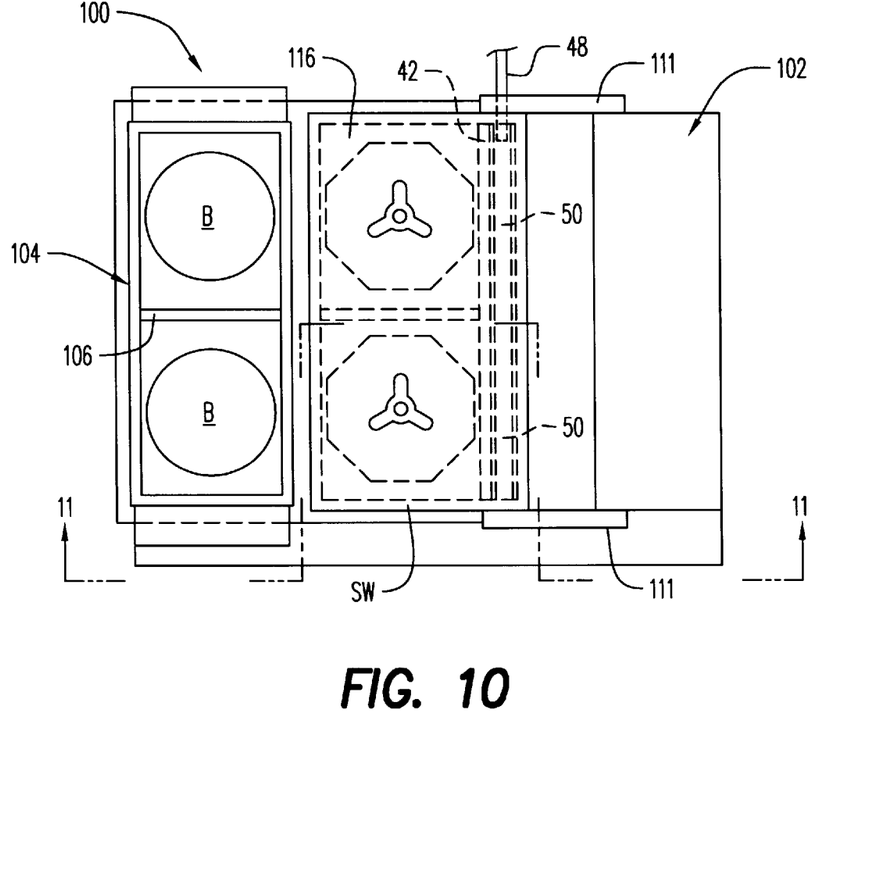
FIG. 10 is a top view of an alternative, automated or continuous mode embodiment of the grilling apparatus of the invention.
Figure 11:
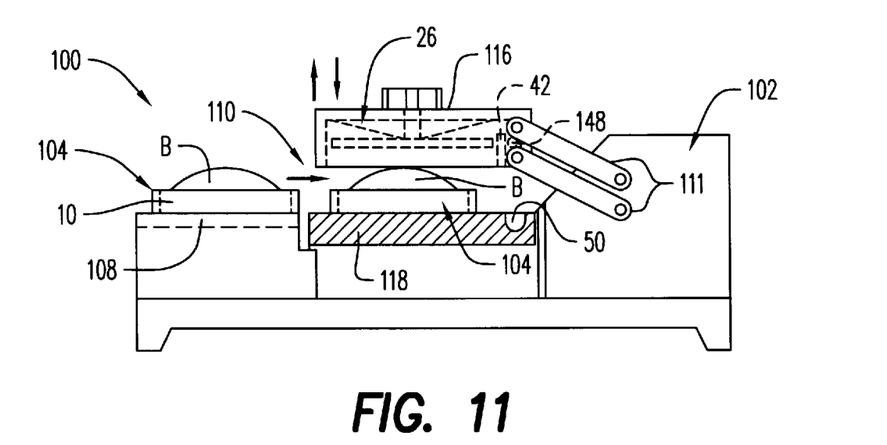
FIG. 11 is a side elevational view partly in vertical section as would be seen generally along line 11—11 of the apparatus of FIG. 10.

FIGS. 10 and 11 show an embodiment of a semi-automatic apparatus of the invention. More particularly, FIGS. 10 and 11 show a griller 100 comprised of a housing 102. Buns are manually or automatically placed cut side-down in a transport tray 104 which preferably is divided into two sections by a separator 106, one half of a cut bun being placed in each section. The tray preferably is heat conductive and can be made of or coated or treated with a release material. The loaded tray is then manually or automatically placed on a support member 107 at a landing station 108 at the front of the housing and manually or automatically moved from there onto heated surface or platen 118 in grilling station 110. As the tray reaches heated platen 118, grill cover 116, mounted to the housing by any suitable means, e.g., brackets 111, is moved automatically downward and closed to form a sealed grilling chamber which encompasses the loaded tray. As in the previous embodiment, once the sealed chamber is formed, the grilling process or cycle automatically commences.

Moisture is introduced into the chamber through nozzle 148 which is attached to and extends through cover 116 into the chamber such that its orifice preferably overlies reservoir or channel 50. Water is injected from the nozzle onto the heated surface of reservoir 50 such that the water instantaneously vaporizes and adds heat to the processing chamber, pressure plates 26 and buns B, while adding moisture to the buns. When grilling is completed, cover 116 is automatically raised, and the loaded tray of grilled buns is automatically moved onto tray landing station 108 to the rear of housing 102 where the buns and tray are exposed for easy manual or automatic removal from the apparatus. Once the grilled buns are removed, the tray or grilling chamber can be reloaded for the next grilling cycle. Any suitable mover (not shown) can be employed. For example, the mover can enter the grilling station area in the space at the rear of the tray, for example, between the rear of the tray and reservoir 50, and can move the tray with the grilled buns thereon back to landing station 108. In another embodiment, the separator, or side, front or rear wall of tray 104 could serve as a divider wall in cooperation with a divider or other wall of cover 116 to form a sub-chamber for the previously described purpose.

Figure 12:
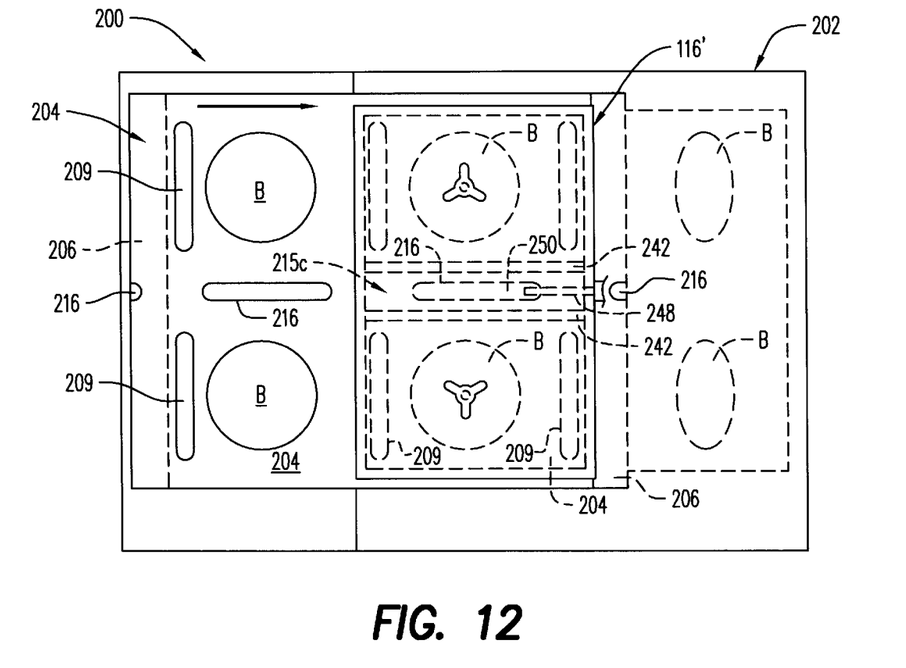
FIG. 12 is a top view of another alternative embodiment of the grilling apparatus of this invention.
Figure 13:
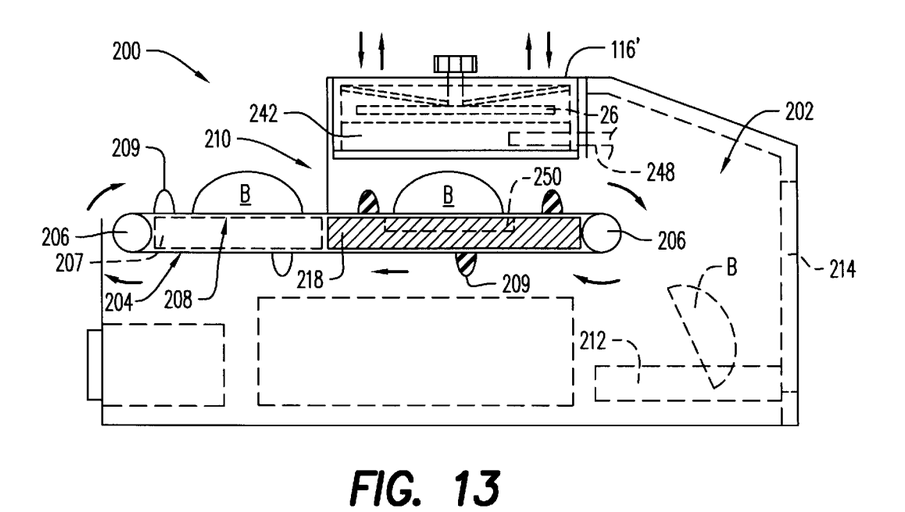
FIG. 13 is a side elevational view, partly in vertical section as would be seen generally along line 13—13 of FIG. 12.
Figure 14:
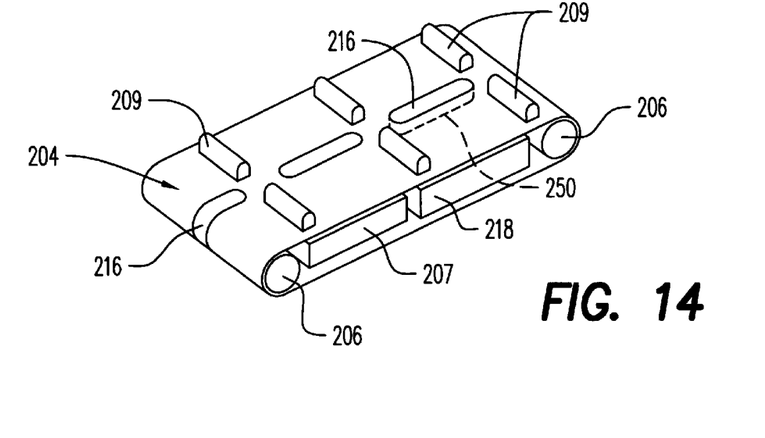
FIG. 14 is a top perspective view of the conveying system shown in FIGS. 12 and 13.

FIGS. 12 and 13 show another embodiment of an automatic grilling apparatus, generally designated 200, comprised of a housing 202 which includes a conveying system for moving buns into and out of grilling station 210. The conveyor system (also shown in FIG. 14) is comprised of a continuous conveyor belt 204 mounted about a pair of rollers 206 at least one of which is driven by means (not sown) to rotate roller(s) 206 and belt 204 in a clockwise direction. A portion of the area of navel of belt 204 (left side of FIGS. 12 and 13) defines a bun receiving or landing area 208 overlying a support member 207.

The conveyor system includes one or more indexing ribs 209, preferably integral with, adhered to or otherwise permanently associated or cooperative with the exposed surface of belt 204 for defining the bun receiving or landing area. Ribs 209 protrude outwardly from the surface of belt 204 and extend vertically across or transverse to the width, i.e., across the conveying direction of belt 204, for retaining the buns on belt 204 in a certain defined area such that they will be oriented for positioning under a pressure plate 26 during grilling. Ribs 209 also act as a back up or stop wall, to assure that if the buns slip or slide rearward on belt 204 they are positively physically engaged by ribs and are moved with the traveling belt along the conveying path into and out of grilling station 210, and thereafter into a bun collection tray 212 at the rear of housing 202.

Collection tray 212 and/or the grilled buns can be manually or automatically removed from housing 202 through a movable flexible heat retaining curtain 214 mounted at the rear of the housing. Conveyor belt 204 has a series of aligned, spaced water slots 216 cut through the thickness of belt 204 and extending in the conveying direction along the axial center of belt 204. Slots 216 are arranged so that they are positioned to a side of and between ribs 209 and help define the bun positioning area together with ribs 209. Slots 216 are spaced so that all or a portion of at least one slot overlies reservoir or channel 250 in heated platen 218 within the sealed grilling chamber when the conveyor belt 209 has indexed and positioned bun halves in the grilling station and chamber.

Figure 15:
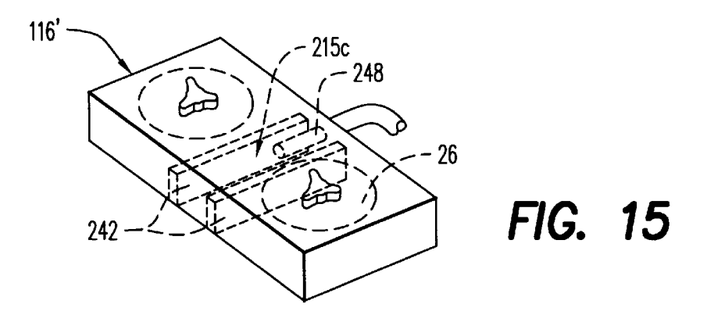
FIG. 15 is a top perspective view of the grilling cover shown in FIGS. 12 and 13.

As more clearly shown in FIG. 15, cover 116' has a sub-chamber 215c defined by divider walls 242. Nozzle 248 extends through the rear wall of cover 116' and into the sub-chamber. As in the prior embodiment, when cover 116' is automatically closed and sealed against the underlying heated surface of belt 204 over heated platen 218 to form a sealed grilling chamber, water injected through nozzle 248 into sub-chamber 215c through slot 216 and onto the heated surface of reservoir 250 instantaneously flashes and vaporizes to achieve the previously stated desired objectives.

Belt 204 can be made of any suitable material. Preferably, it is made of the same material as employed as release material 20 shown in FIGS. 1–4 and 7. It is to be noted that although it is preferred that slots 216 and reservoir 250 be elongated and positioned in the direction of the conveying path, they can be of other shapes and arranged in other suitable positions For example, they can be arranged vertically across conveyor belt 204. There can be one slot extending approximately across part or most of a width of belt 204, or there can be a plurality, preferably two slots spatially aligned end-to-end across a width of belt 204 (as are ribs 209 in FIG. 12). These transversely arranged slots can be positioned to be aligned with and overlie a portion of one or more reservoirs 250 likewise formed transversely across most or a portion or portions of platen 18, 118 or 218. Ribs 209 can be elongated and joined to form an extended rib (not shown) which would extend across most of the belt width.

The ribs and/or slots can be cooperatively formed in any suitable shape, pattern or arrangement, e.g. V-, U-, conical-, circular-, or ring- shaped, etc. Regardless of their selected shapes or arrangement, the ribs and/or slots can be employed effectively in combination with conveyor belts, or movable indexing tables, trays, or other systems. The ribs need not be integral with the belt. For example, they can be integral with or affixed to a web which underlies the belt. Thus, a Teflon-coated belt can ride on a wire or mesh metal web having outwardly protruding metal ribs which extend through rib apertures in the belt. Metal ribs may be more suitable for durability than ribs formed of Teflon-coated fiberglass or the like. One or more elongated ribs can be used instead of or in combination with a cover divider wall, or alongside or in combination with a cover side, front or rear wall at file grilling station to form a sub-chamber for receiving water vapor from the heated surface and assisting in directing it upwardly into the grill cover and then throughout the grilling chamber.

Figure 16:
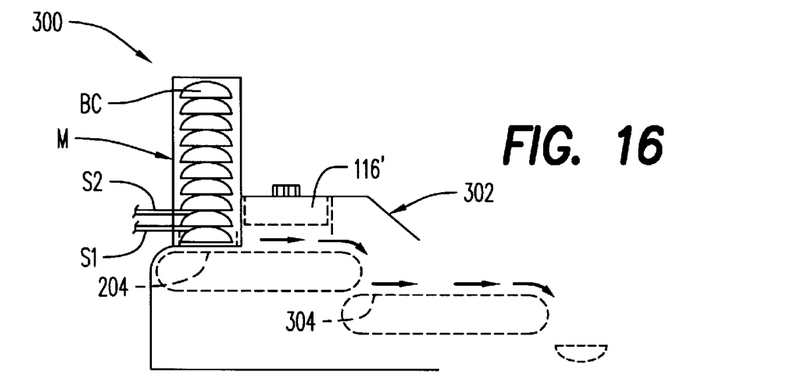
FIG. 16 is a side elevation of a further automated embodiment of the apparatus shown in FIGS. 12 and 13.

FIG. 16 depicts an automated embodiment of the grilling apparatus of the invention, here generally designated 300, which is similar to the apparatus shown in FIGS. 12 and 13, except that it has or is adapted to operate with an automatic bun feeding system, here shown as a bun feeding magazine M at the front or bun input end of the apparatus, and an automatic grilled bun discharge system, here shown as including a second conveying system cooperatively associated with a first conveyor system having the conveyor belt 204 shown in FIGS. 12 and 13.

More particularly, FIG. 16 shows magazine M having a plurality of the crown halves of buns BC stacked cut surface down vertically on top of one another for easily feeding one bun at a time from the stack onto the conveyor belt 204, or a tray or other bun feeding device. Not shown, but behind this stack, there is another similar stack of the heel halves of buns. The magazine preferably provides a divider to maintain the stacks separate. The lower most bun is supported by any suitable support means, here one or more support members generally designated 51 (one shown) at the front and rear (not shown) of the magazine. The members support the stack thereon. Second support members 52 support the next higher bun. When desired, the members 51 are withdrawn and allow the lower most bun half to drop from the stack or stacks onto the bun receiving area of conveyor belt 204. As the conveyor is conveying the buns first deposited onto the belt 204 and/or during their grilling and/or caramelizing, the members 51 are reinserted into the magazine, and support members 52 are withdrawn to deposit the second bun onto first support members 51 which then are withdrawn to deposit this bun onto conveyor belt 204. The moving belt deposits buns cut surface down or up as desired on second conveyor belt 304 which carries them out of housing 302 where they can be removed from the conveyor belt 304 or from an underlying platform for further processing.

Figure 17:
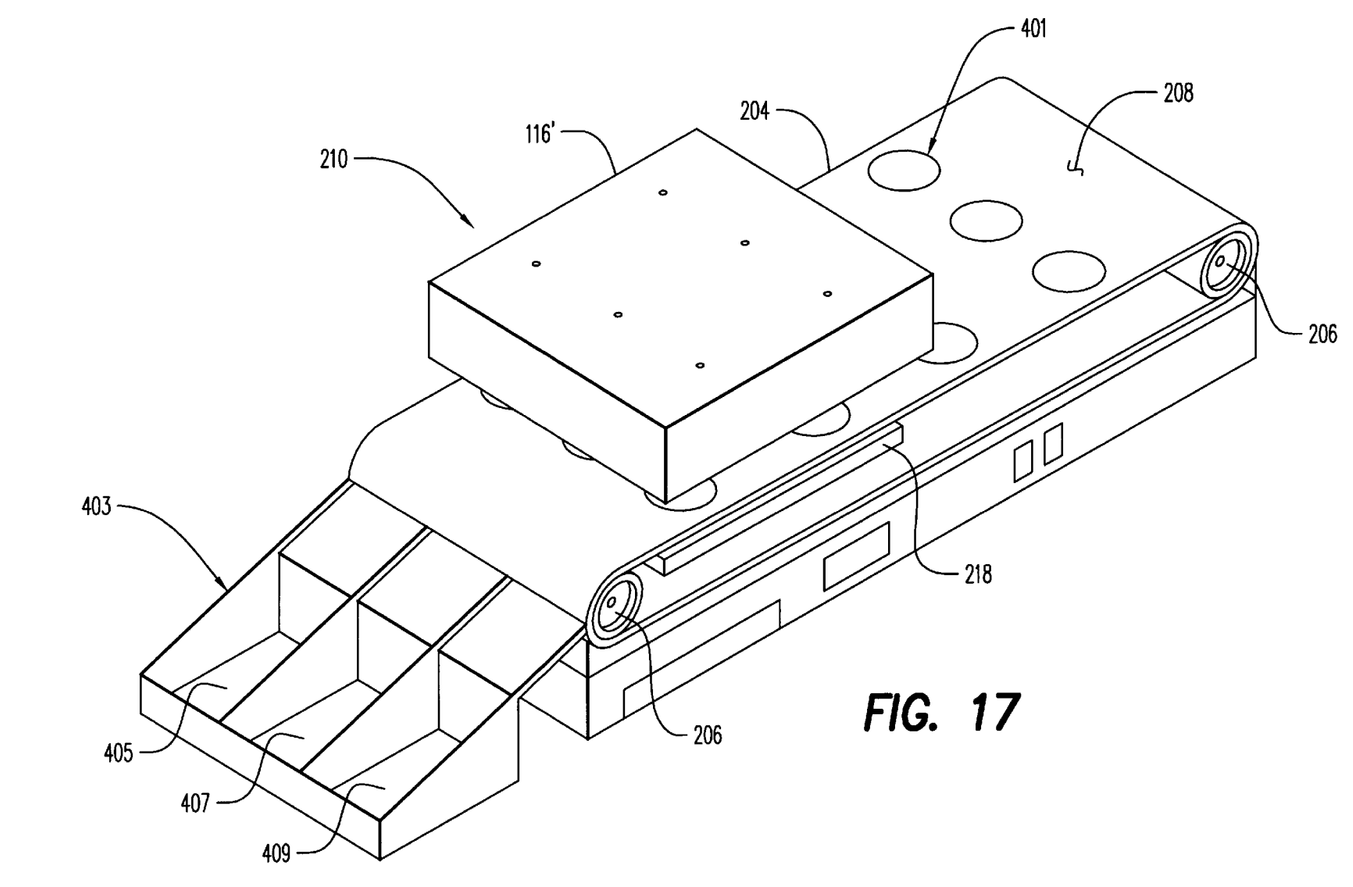
FIG. 17 is a perspective view of another embodiment according to the present invention wherein the buns are placed on a continuously moving conveyorized belt which moves the buns over the platen, thereby providing a continuous rather than a batch mode of operation.

FIG. 17 is similar to the conveyorized bun handling grill shown in FIGS. 12 and 13, but has the added features of thermally imprinted graphics 401, which show the operator how to properly space the buns in order to maintain consistent bun quality. Also, a bun receptacle 403 is provided with individual containers 405, 407 and 409 for receiving grilled buns.

Figure 18:
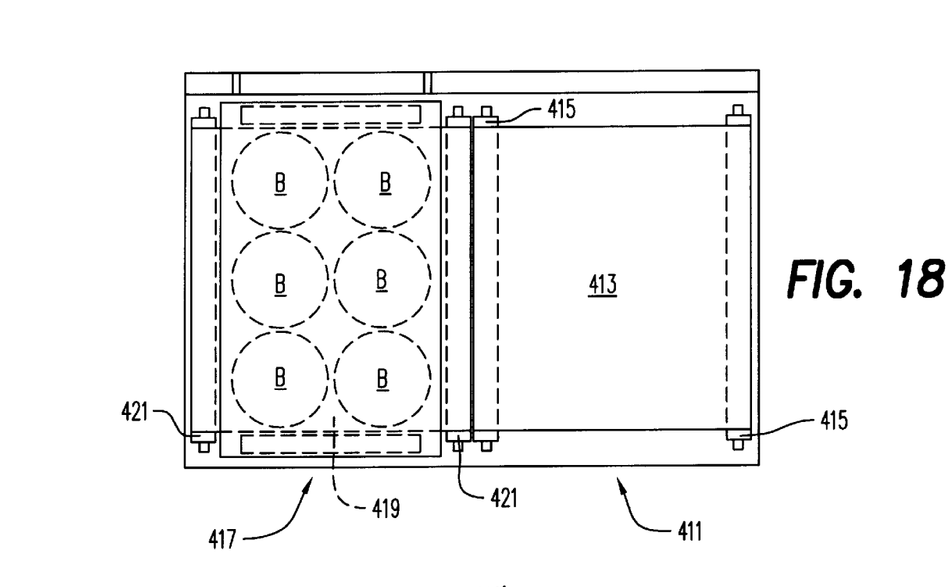
FIG. 18 is a top planar view of another embodiment according to the present invention wherein the griller includes a first staging area belt and a second cooking area belt.
Figure 19:
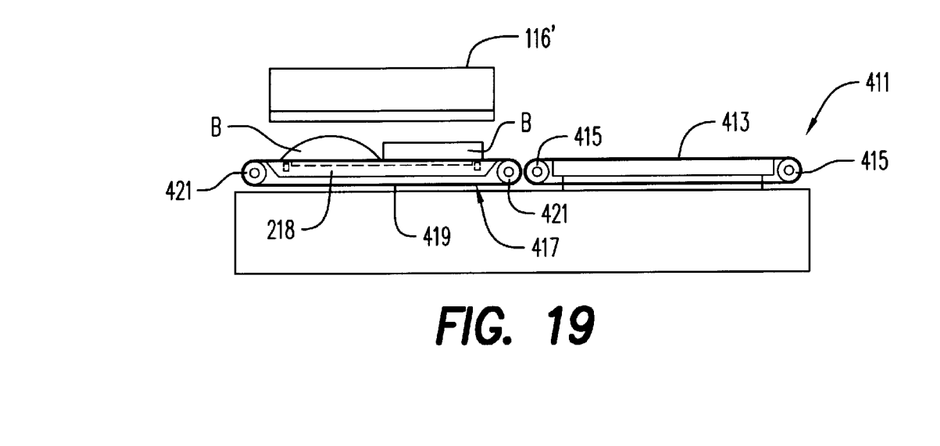
FIG. 19 is a side elevational view of the double belt griller shown in FIG. 18.
Figure 20:
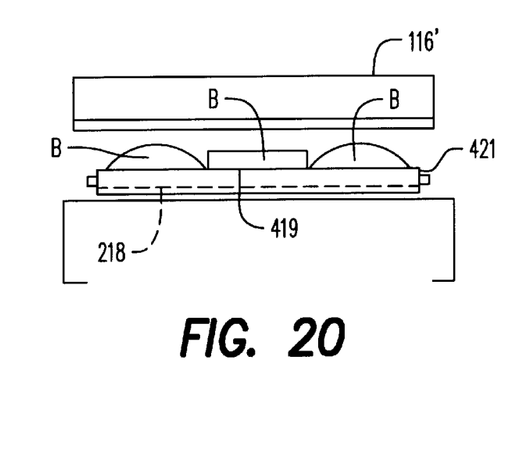
FIG. 20 is a front elevational view of the grill shown in FIG. 18.

FIGS. 18–20 depict another embodiment of a conveyorized bun handling grill, wherein separate conveyorized systems are disposed adjacent to one another for moving buns from a loading station to a grilling station. The loading station moves buns B toward the grilling station via conveyor 411 which rotates belt 413 counter-clockwise towards the grilling station via rollers 415. When buns B reach the end of conveyor 411, they are transferred to conveyor 417 which rotates belt 419 counter-clockwise into position within the grilling station between housing 116' and heated platen 218 via rollers 421. Conveyor 411 is time delayed (not shown) so as to keep buns B in the grilling station for the require time to enable proper caramelization and conditioning of buns B before they are discharged from the grilling system.

The apparatus of this invention can be operated in accordance with the unique method of this invention to condition buns (i.e., grill and caramelize buns rapidly with little moisture loss). According to the method of this invention, buns are grilled and caramelized rapidly at high temperatures for short times in a closed and sealed steam atmosphere. Because steam is used in the process, the high temperatures and short times are obtained and a high percentage of moisture is retained in the grilled buns. The method of the invention broadly comprises providing a bun having a cut surface, providing a surface which is heated at a temperature broadly of from about 425° F. to about 575° F., preferably from about 450° F. to about 550° F., and most preferably from about 475° F. to about 525° F., placing the bun cut surface-down against the heated surface, enclosing the bun in a closed sealed chamber formed in part by the heated surface, and while applying pressure onto a top portion of the bun to compress its cut surface against the heated surface, grilling the bun in a steam atmosphere for a period of time sufficient to caramelize its cut surface, the time period broadly being for 20 seconds or less, preferably less than 15 seconds, and most preferably from about 8 seconds to about 12 seconds or less. Higher temperatures could be employed depending on various factors, such as the capabilities of the materials employed in the apparatus and the characteristics of the buns to be grilled.

For example, the upper temperature of about 575° F. is preferably since the practical upper temperature limit of the Teflon-coated fiberglass material disposed on the heated surface or platen is about 575° F. before such material starts to decompose. The use of very high temperatures within and beyond the stated range generally may also be limited by the characteristics of the bun to be grilled. For example, 575° F. generally would not be recommended for the relatively less dense, typically light, approximately 32% moisture-containing standard burger buns, particularly if these temperatures are held for relatively long times. At the stated temperatures, the period of time sufficient to caramelize the cut surface of the buns will vary depending on various factors again. For example, the characteristics of the buns to be grilled, their type, size, density, texture and ingredients, e.g., their fiber, sugar and particularly their pre-grilled moisture content. Generally, the higher the temperatures used, the shorter the time employed, required or desired, and vice versa.

Buns can be satisfactorily grilled and caramelized at the stated temperatures within a sealed chamber for a time broadly ranging up about to 20 seconds or less. With the heated surface at about 575° F., satisfactory caramelization of certain buns can be obtained in as little as about 8 seconds, while at the lower temperature of 425° F. as long as 20 seconds may be required, e.g., for hard crusted, dense buns. However, extended times are not desired or required for caramelizing buns sold by most commercial fast food services. For such buns and/or services, preferred operating conditions would be about 450° F., to about 550° F. for a grilling period of from about 8 to about 12 seconds. It has been found that the previously mentioned standard burger buns can be grilled and uniformly caramelized at from about 475° F., to about 525° F. for about 8 to 12 seconds with only 3% or less usually only a ½% to 1% loss of moisture. This is to be compared with conventional toasting devices wherein standard burger buns are caramelized at lower temperatures of about 350° F., to about 450° F. for longer times of from about 30 seconds to 45 seconds with a higher, about a 5 to 7%, loss in moisture content.

The lower heating platen 218 operating below and above these critical operating range of 425 to 575° F. resulted in unacceptable caramelized textured surfaces. The upper compression plate which also provides thermal heat transfer was found to have an optimum range of 180 to 240° F. Lower temperatures resulted in bun crowns not achieving product temperature goals. Plate temperatures higher than 240° F. resulted in toasting of the outer surface which is not desirable. Both the upper and lower surfaces require a release surface to prevent the product from sticking.

A key element of the apparatus and method of the invention which permits obtaining caramelization at such high temperatures in such short times is that grilling and caramelization is effected in a closed or sealed steam environment. The buns are grilled in a sealed enclosure or chamber filled with steam. This adds heat to the system for higher grilling temperatures and shorter grilling and caramelization times, and provides and drives as much moisture as possible into the bun. This minimizes loss of moisture from the bun, or stabilizes, maintains, or perhaps even increases its moisture content especially if the pre-grilled moisture content is already relatively low.

Heat from the steam also advantageously raises the temperature of the pressure plate whose face is in contact with a portion of the crown or heel of the bun half being grilled. This helps to rapidly raise the bun interval temperature from between about 150° F. to 170° F. which is required for caramelization.

The amount of water provided and steam employed depends upon various factors such as the effectiveness of the seal of the grilling chamber, its size, the grilling time desired, the temperature provided to the grilling chamber by the heated surface, and the type, number and characteristics of the buns being grilled. Generally, the amount of water employed is the minimum amount which can be injected to rapidly provide the maximum of steam needed to fill the chamber at the beginning of the grilling cycle, and to maintain that filled condition for as long as needed during the processing cycle. If too much water is injected into the chamber, there is the risk that too much moisture will be driven into the bun and it will become overly moist or soggy and/or water droplets will occur on the bun surface and will change its color.

Preferably, the steam is provided to the system as rapidly as possible. In accordance with the invention, it has been found that for caramelizing a standard burger bun (two halves), injecting ½ to 1 teaspoon of water per crown and heel into the sealed chamber in a manner which causes the water to instantly vaporize into steam has been satisfactory to rapidly caramelize the buns at temperatures and for the times mentioned above while minimizing moisture loss to about 3% or less, usually about 1% or ½%.

Although steam can be provided to the chamber by any suitable method and means, such as directly into file sealed chamber, it is preferred that the water be provided in the manner herein described directly into the sealed chamber and onto a portion of heated platen whose temperature is within the stated temperature range. This technique instantly vaporizes the water, instantly and uniformly fills the chamber with steam, rapidly adds heat to the chamber and bun and assists in caramelizing and rapidly driving moisture into the bun, without rendering the bun overly moist or soggy. The steam can be provided for any suitable length of time under the circumstances. It has been found that for grilling and caramelizing the halves of a bun with the first embodiment of the invention, when ½ to 1 teaspoon of water is ejected into the sealed chamber, the water need only be injected under about 30 psi for about the initial ½ second of a 10 second sealed grilling time for a standard burger bun.

With such a burst, the ½ to 1 teaspoon of water is injected a sufficient distance along platen reservoir so as to instantly and uniformly vaporize the sealed chamber. The preferred approach of this invention avoids contacting the bun halves with water droplets as this tends to form spots on the him surface which are lighter in color than the rest of the crown or heal surface of the grilled bun. Instantly vaporizing water along an elongated highly heated reservoir surface and thereby instantaneously flash filling the grilling chamber with steam effectively prevents water-to-bun contact. The desired and achieved effect of the water injection is instantaneous total vaporization effected over an extended surface to uniformly distribute and rapidly fill the chamber with steam and retain that condition for as long a time of the remainder of the sealed grilling cycle as possible. The water injected into the chamber can be at any temperature. The heated surface, here the heated platen can be any suitable material, and heated by any suitable means. Preferably, the platen is made of aluminum which is cast with suitable electric resistance heaters therein. The channel or reservoir can be machined into a portion of the platen surface. For grilling and caramelizing two standard burger bun halves with the apparatus of this invention, the reservoir can be from about ¼ to 1 inch wide and from about ⅛ to ¼ inch deep. A suitable reservoir is about ¼ inch wide and about ⅛ inch deep.

The bun conditioning device of the present invention operates effectively by exposing the bun to a steam pressure during the grilling process. This steam pressure is developed by flashing a precise amount of ambient (75° F.) water on to the hot platen 218 in a controlled area within the grilling chamber. This flash develops a burst of steam that diminishes during the grilling cycle. Peak pressures were recorded at ½ a lb. or 14 inch-H$_2$O. This pressure peak varies depending on the volume of water injected and the temperature of the contact surface and the enclosure seal. The range of water volume that this device operates within is between about 1.5 grams to 5.5 grams per single bun (i.e., a crown and heel). For multiple buns conditioning devices the range of water set forth immediately above would be multiplied by the number of buns conditioned. Tests at the lower limits resulted in low product temperatures and greater moisture losses. The upper limits of water injection resulted in bun product having wet surfaces which were undesirable.

A key element of the invention to obtain caramelization is the provision of compressive pressure onto an upper portion of the crown and for heel of the bun being grilled, to bring or force the bun's cut surface fully into contact with the heated surface. This contact is necessary to obtain caramelization of the cut surface. The pressure also reduces the time necessary to achieve caramelization. Preferably the compressive pressure is uniformly provided and distributed against the bun halves to provide uniform caramelization. Although the pressure plates can be of any suitable shape or profile, flat plates of greater breadth than the breadth of the buns to be grilled are preferred. Domed plates which would conform to the crown surface of buns are not desired for an ambient steam system because they would prevent ambient steam from being driven rapidly into the covered exterior portions of the bun. The height of each pressure plate of the invention can be pre-set to accommodate the height of the crown or heel portion of the bun under it such that each plate properly and sufficiently compresses the bun halves to be grilled and/or uniformly caramelized thereunder. Each plate though pre-set at a particular height is adapted to adjust or float to accommodate occasional unusual heights, profiles or locations of buns halves positioned thereunder.

This bun conditioning device has a unique upper push plate within the grilling chamber which applies a force to the bun during the grilling process. This plate's finger springs are designed to apply an initial force that reduces during the grilling process. This initial force ranges from between about 3 to 6 pounds per square inch. The final force is mechanically stopped at a pre-adjusted gap setting, ranging from between about 0.312" to 1.000". Note that the bun profile or height determines the final gap requirement. This push plate also has the ability to conform to the irregular shape of a bun crown without damaging the shape. This was due to the pressure of the finger springs. Alternatively, a weighted plate may be used to allow gravity to force the compression.

In accordance with the invention, the words "cut surface" of the bun are to be interpreted broadly to include the exposed interior surface of the bun obtained by any method and/or means, not just by cutting, as with a knife. Thus, the cut surface can be obtained by manually separating or pulling all or a portion of a bun apart, or by wedging the bun apart with say a fork, as well as by cutting.

The apparatus of the invention can be operated with conventional devices, drives, systems and controls. These are not shown in the drawings. The apparatus includes a temperature control system which provides the platen and/or release material, preferably the platen, with a desired temperature which is set within the stated temperature range for the particular buns being grilled and/or caramelized. The set temperature preferably is maintained between grilling/caramelization cycles. A timing system is provided to control the grilling/caramelization time or cycle, that is, the duration of time that the cover is closed and sealed against the heated surface, the time period commencing on closure of the cover and terminating when grilling and/or caramelization is completed. With the manually operated cover, at the end of the set processing cycle, a cover latch associated with the timer and which locks the cover in the closed position, is released and the cover opens. In the automated versions of the apparatus, the timing system can be associated with an automatic cover control system to set the time of and to effect the opening and closing of the cover to correspond to or encompass the set time for grilling and/or caramelization. The timing system can also be associated with a moisture provision system which includes means for injecting water under pressure, for metering the amount of water injected, and for injecting it for the desired period, preferably at the commencement of file grilling cycle. One or more alarm systems, visual or auditory, can be provided to indicate to an operator when the grilling cycle starts and ends.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. Apparatus for high speed grilling or conditioning of a food product which comprises:
    a heatable surface which is capable of caramelizing said food product at a temperature in the range between about 425° F. to 575° F.;
    a chamber for enclosing said food product on said heatable surface under pressure; and
    means for introducing steam into said chamber during the caramelization of said food product.

2. The apparatus of claim 1 wherein said chamber comprising a food product containment chamber, a secondary steam chamber which is capable of preventing steam droplets from contacting said food product, and a means for applying physical pressure to said food product to ensure that said food product is in substantial contact with said heatable surface.

3. The apparatus of claim 1 wherein said food product is heated to a temperature in the range from between about 450° F. to 550° F.

4. The apparatus of claim 3 wherein said food product is heated to a temperature in the range from between about 475° F. to 525° F.

5. The apparatus of claim 1 wherein said caramelization of said food product occurs within 20 seconds or less from the time said food product is placed on said heatable surface.

6. The apparatus of claim 5 wherein said caramelization of said food product occurs in a period between about 8 to 12 seconds.

7. The apparatus of claim 1 wherein said food product exhibits a moisture loss of about 3% or less during said caramelization.

8. The apparatus of claim 7 wherein said food product exhibits a moisture loss of between about ½% to 1% during said caramelization.

9. The apparatus of claim 1 wherein said means for introducing steam into said chamber is by flashing water on said heatable surface.

10. The apparatus of claim 9 wherein said water is present in an amount between about 1.5 grams to 5.5 grams per single food product.

11. The apparatus of claim 1 further comprising a conveyor, and said conveyor comprises said heatable surface.

12. The apparatus of claim 1 further comprising two conveyors, one of said conveyors comprising said heatable surface.

13. The apparatus of claim 2 wherein said means for applying physical pressure to said food product comprises a pressure plate adapted to provide uniform contact, pressure and caramelization of said food product.

14. The apparatus of claim 1 wherein said means for introducing steam into said chamber includes a portion of said heatable surface which is exposed, means for heating said exposed surface portion at a temperature sufficient to instantly vaporize water deposited on said exposed surface portion, and a nozzle for introducing water into the sub-chamber so that the water falls on said exposed surface portion of said heated surface and instantly vaporizes within said chamber.

* * * * *